(12) United States Patent
Kittaka et al.

(10) Patent No.: US 6,807,337 B2
(45) Date of Patent: Oct. 19, 2004

(54) OPTICAL DEVICE

(75) Inventors: Shigeo Kittaka, Osaka (JP); Masahiro Oikawa, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 149 days.

(21) Appl. No.: 10/131,047

(22) Filed: Apr. 25, 2002

(65) Prior Publication Data

US 2003/0035621 A1 Feb. 20, 2003

(30) Foreign Application Priority Data

Apr. 26, 2001 (JP) .................................... P2001-129344

(51) Int. Cl.[7] ................................................ G02B 6/32
(52) U.S. Cl. .............................. 385/34; 385/33; 385/31; 385/47
(58) Field of Search ............................ 385/34, 33, 31, 385/15, 47

(56) References Cited

U.S. PATENT DOCUMENTS

2001/0017961 A1 * 8/2001 Kittaka ........................ 385/34
2002/0159695 A1 * 10/2002 Koshi et al. .................. 385/34

FOREIGN PATENT DOCUMENTS

JP          60-91316       5/1985

OTHER PUBLICATIONS

Nishizawa, K., "Tprinciple and Application on Gradient Index Optical Imaging", The Review of Laser Engineering, vol. 8, No. 5, pp. 748–758 (1980).

* cited by examiner

Primary Examiner—Rodney H. Bovernick
Assistant Examiner—Sung Pak
(74) Attorney, Agent, or Firm—Whitham, Curtis & Christofferson, P.C.

(57) ABSTRACT

In an optical system in which light output from an optical fiber (11) is collimated into parallel light rays by a gradient index rod lens (13), reflected by a filter (4) and then converged again by the rod lens (13) so that the resulting light is coupled to an optical fiber (12), a principal beam component of the light output from the optical fiber (11) disagrees with an optical axis (32) of the optical fiber (12) to thereby cause a coupling loss. When W is the distance between optical axes (31 and 32) of optical fibers (11 and 12) and Z is the length of a rod lens (13) on an optical axis (33) of the rod lens, the optical fibers (11 and 12) and the rod lens (13) are disposed to satisfy the condition:

$$W \cdot g \cdot (0.25 - Z/P)^2 \leq 6 \times 10^{-5}$$

in which g is a gradient index distribution coefficient of the rod lens, and P is the periodic length of the rod lens (13).

4 Claims, 8 Drawing Sheets

OPTICAL DEVICE

BACKGROUND OF THE INVENTION

The present invention relates to an optical device used in a communication system using optical fibers and particularly relates to an optical device using a gradient index rod lens provided with a reflecting layer.

In recent years, increase in capacity of an optical fiber communication network has been strongly demanded because of the rapid advance of popularization of Internet. Development of wavelength division multiplexing (WDM) communication as a method for increasing the capacity has been advanced rapidly. In WDM communication, light beam components with slightly different wavelengths are demodulated individually and mixed into an optical signal so that the optical signal can be transmitted through one optical fiber. At an end point of transmission, the optical signal in which the light beam components with different wavelengths are mixed is separated into light beam components by wavelengths so that the light beam components with different wavelengths can be received. The mixing of light beam components into an optical signal is referred to as "multiplexing" and the separation of the optical signal into light beam components is referred to as "demultiplexing". A multiplexer/demultiplexer using an optical filter is used as a method for performing such multiplexing/demultiplexing.

An upper half of FIG. 6 shows an example of the multiplexer. As shown in the upper half of FIG. 6, the wavelength multiplexer has three optical fibers, a pair of lenses, and a filter. That is, light with a wavelength of λ1 is output from an optical fiber 101. The light is input to a rod lens 103. The light with a wavelength of λ1 reaches a filter 104 while converted into a parallel beam by the rod lens 103. The filter 104 reflects the light with a wavelength of λ1. The reflected light is input to the rod lens 103 again and converged by the rod lens 103. The converged light is coupled to an optical fiber 102. On the other hand, light with a wavelength of λ2 is output from an optical fiber 111. The light with a wavelength of λ2 reaches the filter 104 while converted into a parallel beam by a rod lens 113. The filter 104 transmits the light with a wavelength of λ2. The light transmitted through the filter 104 is input to the rod lens 103 and converged by the rod lens 103. The converged light is coupled to the optical fiber 102. In this manner, a light component with a wavelength of λ1 output from the optical fiber 101 and a light component with a wavelength of λ2 output from the optical fiber 111 are multiplexed so that the multiplexed light is coupled to the optical fiber 102.

Demultiplexing is performed as shown in a lower half of FIG. 6. That is, light components with wavelengths of λ1 and λ2 are output from the optical fiber 102. The light components are input to the rod lens 103. The light components reach the filter 104 while converted into parallel beams by the rod lens 103. The filter 104 reflects the light component with a wavelength of λ1. The reflected light component is input to the rod lens 103 again and converged by the rod lens 103. The converged light component is coupled to the optical fiber 101. On the other hand, the light component with a wavelength of λ2 reaches the filter 104 while converted into a parallel beam by the rod lens 103. The filter 104 transmits the light component with a wavelength of λ2. The light component transmitted through the filter 104 is input to the rod lens 113 and converged by the rod lens 113. The converged light component is coupled to an optical fiber 112. In this manner, light components with wavelengths of λ1 and λ2 output from the optical fiber 102 are demultiplexed into the optical fibers 101 and 112.

When the optical system shown in FIG. 6 is used practically, a filter 4 may be brought into contact with an end surface 43b of a left rod lens 3 as shown in FIG. 7. Incidentally, a right rod lens is not shown in FIG. 7. When the filter 4 is disposed as shown in FIG. 7, it is unnecessary to position and fix the rod lens and the filter separately for forming the optical system as a module. There is an advantage in that the long-term stability of the optical system can be improved as well as the optical system can be assembled easily. This is a configuration effectively using the characteristic that the rod lens has a planar end surface.

In FIG. 7, an output optical fiber 1 and an input optical fiber 2 are disposed in parallel to each other, similarly to those in FIG. 6. End surfaces 41 and 42 of the two optical fibers 1 and 2 are disposed so as to face an end surface 43a of the rod lens 3 through a gap of a suitable distance. The gap may be formed as an air layer or may be filled with a medium 5 such as matching oil or an adhesive agent.

For example, the index distribution of the rod lens 3 is given by the following formula (see Japanese Patent Laid-Open No. 91316/1985):

$$n(r)^2 = n_0^2 \cdot \{1 - (g \cdot r)^2 + h_4(g \cdot r)^4 + h_6(g \cdot r)^6 + h_8(g \cdot r)^8 + \ldots\}$$

in which r is a radial distance measured from the optical axis of the rod lens, $r_0$ is the effective radius of the rod lens, $n_0$ is the refractive index of the rod lens on the optical axis of the rod lens, g is a gradient index distribution coefficient of second order, and $h_4$, $h_6$, $h_8$ ... are gradient index distribution coefficients of fourth, sixth, eighth ... order respectively.

The periodic length P of the rod lens is equal to $2\pi/g$. When the length Z of the rod lens 3 on the optical axis of the rod lens 3 is set to be slightly smaller than 0.25P, a luminous flux output from the optical fiber 1 is collimated into approximately parallel light rays at the end surface provided with the filter 4. Hence, the luminous flux reflected by the filter 4 is converged again and returned to the optical fiber 2.

When the position of the end surface 41 of the optical fiber 1 is adjusted both in a direction of the optical axis 21 and in a direction perpendicular to the optical axis 21 while the two optical fibers 1 and 2 are disposed in parallel to the optical axis 23 of the rod lens 3, the luminous flux output from the optical fiber 1 is focused on the end surface 42 on the optical axis 22 of the optical fiber 2 so that high coupling efficiency can be obtained.

In the arrangement shown in FIG. 7, however, a principal beam component (defined as a beam component of maximum intensity forming a symmetrical center of Gaussian beams) of the light output from the optical fiber 1 disagrees with the optical axis 22 of the optical fiber 2. Hence, an inclination θd is generated in an XZ plane as shown in FIG. 8. As a result, a coupling loss corresponding to the size of the inclination θd is produced.

The inclination θd can be eliminated if the length of the rod lens 3 is set to be 0.25 pitches while the end surfaces 41 and 42 of the two optical fibers are brought into contact with the end surface 43a of the rod lens. In such a design, there is however a disadvantage in that the degree of freedom for delicate adjustment of focusing and positioning the fibers is spoiled. If the lens length is shortened, the adjustment can be made easily because the distance between each of the end surfaces 41 and 42 of the optical fibers 1 and 2 and the end surface 43a of the lens 3 becomes long, but there is a problem that the loss due to the inclination θd becomes large.

SUMMARY OF THE INVENTION

The invention is to provide a condition for suppressing the loss due to the inclination θd to be in a practically allowable range.

An optical device includes an optical system constituted by a combination of an output optical fiber, an input optical fiber and a gradient index rod lens, the output optical fiber and the input optical fiber being arranged so that optical axes of the two optical fibers are parallel to each other with a distance of W, the gradient index rod lens having a length of Z on its optical axis and having a radially gradient index distribution represented by a formula:

$$n(r)^2 = n_0^2 \cdot \{1 - (g \cdot r)^2 + h_4(g \cdot r)^4 + h_6(g \cdot r)^6 + h_8(g \cdot r)^8 + \ldots\}$$

in which r is a radial distance measured from the optical axis of the rod lens, $r_0$ is the effective radius of the rod lens, $n_0$ is the refractive index of the rod lens on the optical axis of the rod lens, g is a gradient index distribution coefficient of second order, and $h_4$, $h_6$, $h_8$ . . . are gradient index distribution coefficients of fourth, sixth, eighth . . . order respectively, wherein:

the optical axes of the two optical fibers are disposed in parallel to the optical axis of the rod lens so that, after a luminous flux output from the output optical fiber is input to the rod lens through a first end surface of the rod lens and converted into an approximately parallel luminous flux in the inside of the rod lens, at least one part of the parallel luminous flux is reflected by a reflecting unit such as a filter disposed on a second end surface of the rod lens opposite to the first end surface of the rod lens, converted into a convergent luminous flux again in the inside of the rod lens, and input to the input optical fiber; and the optical device preferably satisfies a condition:

$$W \cdot g \cdot (0.25 - Z/P)^2 \leq 6 \times 10^{-5}$$

in which P is a periodic length of the rod lens (equivalent to $2\pi/g$), and Z is the length of the rod lens on the optical axis of the rod lens.

More preferably, the condition range is:

$$W \cdot g \cdot (0.25 - Z/P)^2 \leq 2 \times 10^{-5}$$

Preferably, the two optical fibers have end surfaces parallel to a line perpendicular to the optical axes of the two optical fibers and inclined at an angle of inclination to a plane perpendicular to the optical axes of the two optical fibers. Preferably, the rod lens has an end surface facing the two optical fibers, parallel to a line perpendicular to the optical axes of the two optical fibers and inclined at an angle of inclination to a plane perpendicular to the optical axes of the two optical fibers.

The present disclosure relates to the subject matter contained in Japanese patent application No. 2001-129344 (filed on Apr. 26, 2001), which is expressly incorporated herein by reference in its entirety.

DESCRIPTION OF THE PREFERRED EMBODIMENT

The invention will be described specifically with reference to the following embodiment.

Figure 1:
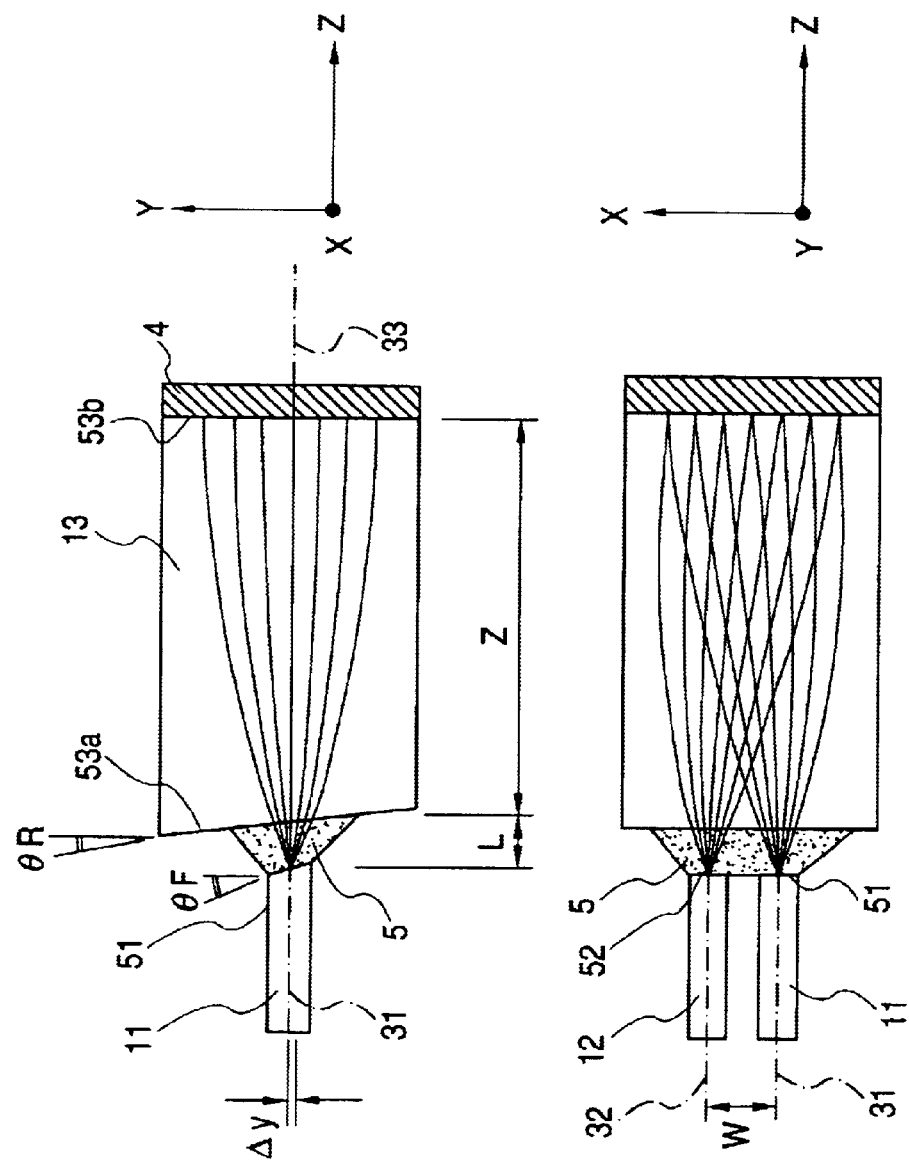
FIG. 1 is a view showing an optical device according to the invention.
Figure 7:
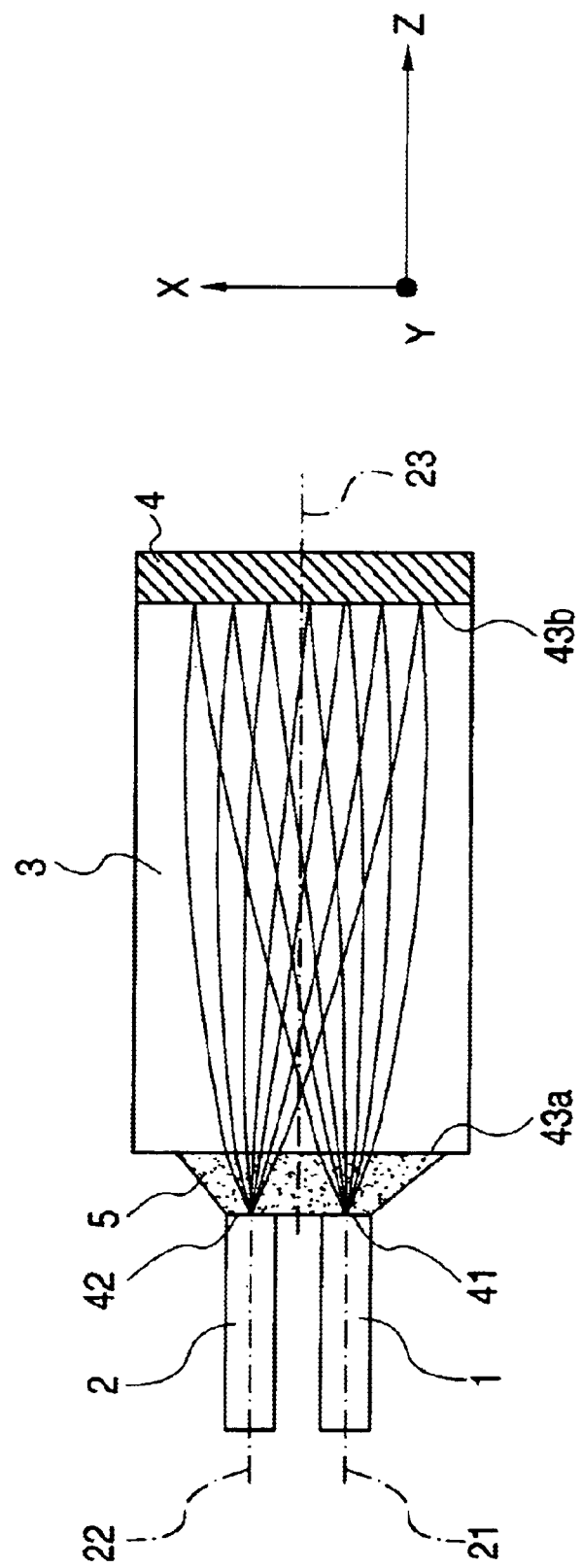
FIG. 7 is a view typically showing a mode of the optical device using a rod lens.
Figure 8:
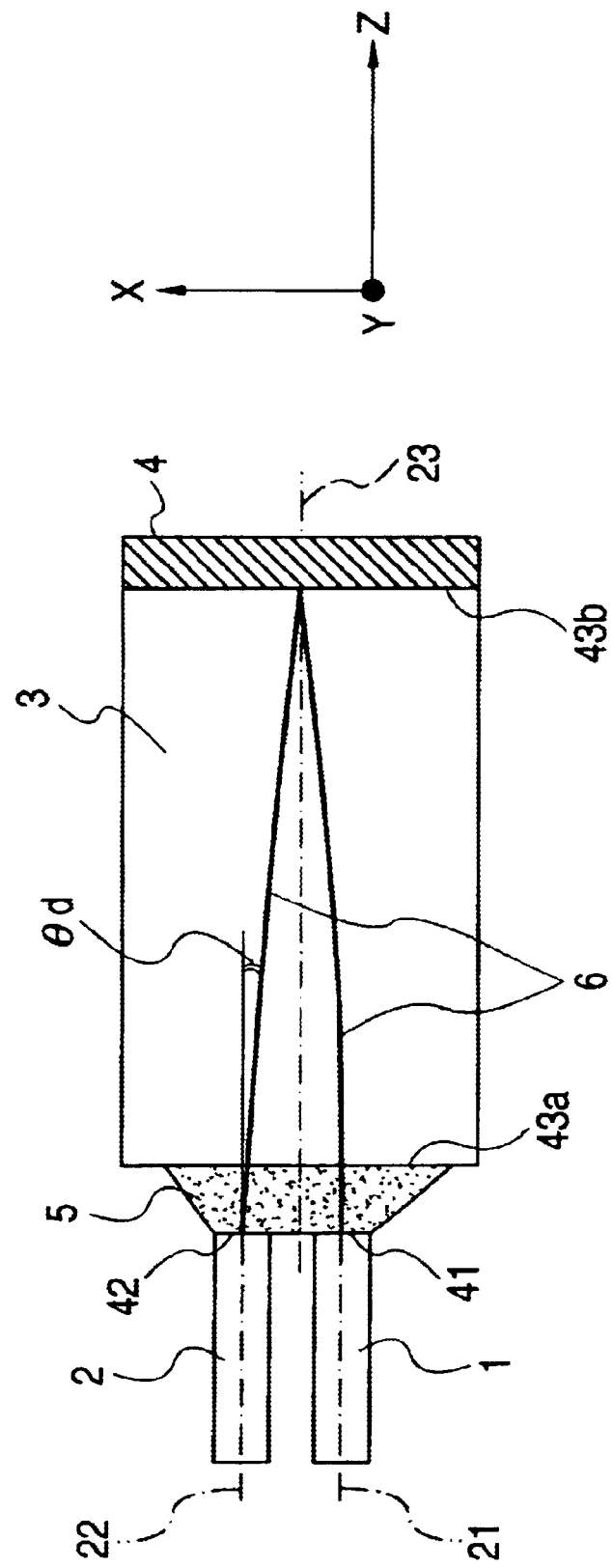
FIG. 8 is a view showing a principal beam component of light in the optical device using a rod lens.

FIG. 1 shows an optical system of an optical device which is an embodiment of the invention. An upper half of FIG. 1 is a side view showing a YZ plane and a lower half of FIG. 1 is a top view showing an XZ plane. The optical system is basically equivalent to that shown in FIG. 7. The optical device according to this embodiment is constituted by an arrangement of an output optical fiber 11, a gradient index rod lens 13 and an input optical fiber 12.

As shown in FIG. 1, the output optical fiber 11 and the input optical fiber 12 are arranged in parallel to each other. The distance between optical axes 31 and 32 of the optical fibers 11 and 12 is W. End surfaces (facing the rod lens) 51 and 52 of the optical fibers 11 and 12 are generally processed obliquely in order to prevent crosstalk from being caused by reflected light. The oblique surfaces (obliquely processed end surfaces) 51 and 52 are inclined in a direction in which a plane parallel to an XY plane is rotated around an X axis in FIG. 1 (the angle of inclination of each oblique surface is defined as an angle θF between the XY plane and each oblique surface). In most cases, the angle θF is in a range of from 6° to 8°.

For the same reason, an end surface (facing the optical fibers) 53a of the rod lens 13 is often processed obliquely (the angle of inclination of the end surface 53a is defined as θR like θF). The end surface 53a of the rod lens 13 is disposed so as to face the end surfaces 51 and 52 of the two optical fibers 11 and 12 through a gap portion of a suitable distance L. The gap portion is filled with a medium 5 having a refractive index of $n_L$.

For example, the index distribution of the rod lens 13 is given by the following formula:

$$n(r)^2 = n_0^2 \cdot \{1 - (g \cdot r)^2 + h_4(g \cdot r)^4 + h_6(g \cdot r)^6 + h_8(g \cdot r)^8 + \ldots\}$$

in which r is a radial distance measured from the optical axis of the rod lens, $r_0$ is the effective radius of the rod lens, $n_0$ is the refractive index of the rod lens on the optical axis of the rod lens, g is a gradient index distribution coefficient of second order, and $h_4$, $h_6$, $h_8$ . . . are gradient index distribution coefficients of fourth, sixth, eighth . . . order respectively.

The periodic length P of the rod lens is equal to $2\pi/g$. When the length Z of the rod lens 13 on the optical axis 33 of the rod lens 13 is set to be slightly smaller than 0.25P, a luminous flux output from the optical fiber 11 is collimated into approximately parallel light rays at the end surface 53b provided with the filter 4 which is a reflecting unit. Hence, the luminous flux reflected by the filter 4 is converged again and returned to the optical fiber 12. Incidentally, the effective radius $r_0$ of the rod lens means a range in which the rod lens fulfills its optical performance effectively. Generally, the effective radius of the rod lens is smaller than the physical radius of the rod lens because there may occur a case where aberration in the outer circumferential portion of the rod lens is so large that lens characteristic is disordered in the outer circumferential portion of the rod lens. Incidentally, the physical radius is not shown in the drawings.

The two optical fibers 11 and 12 are arranged in parallel to a Z axis. Assume now that Δy is the Y ordinate of each of the optical axes 31 and 32 with reference to the optical axis 33 of the rod lens. When Δy and L are adjusted, high coupling efficiency can be obtained because the luminous flux output from the optical fiber 11 is focused on the end surface 52 on the optical axis 32 of the optical fiber 12.

The size of the coupling loss which is caused by the inclination θd of the principal beam component of light and which is an issue on the optical system depends on the optical characteristic decided by the index distribution of the rod lens, the shape of the rod lens and the positional relation between each optical fiber and the rod lens. Hence, the characteristic of the coupling loss was examined by simulation for a specific optical system. An optical design software application "Oslo Six" made by Sinclair Optics, Inc. in the U.S. was used for calculating the coupling efficiency.

Figure 6:
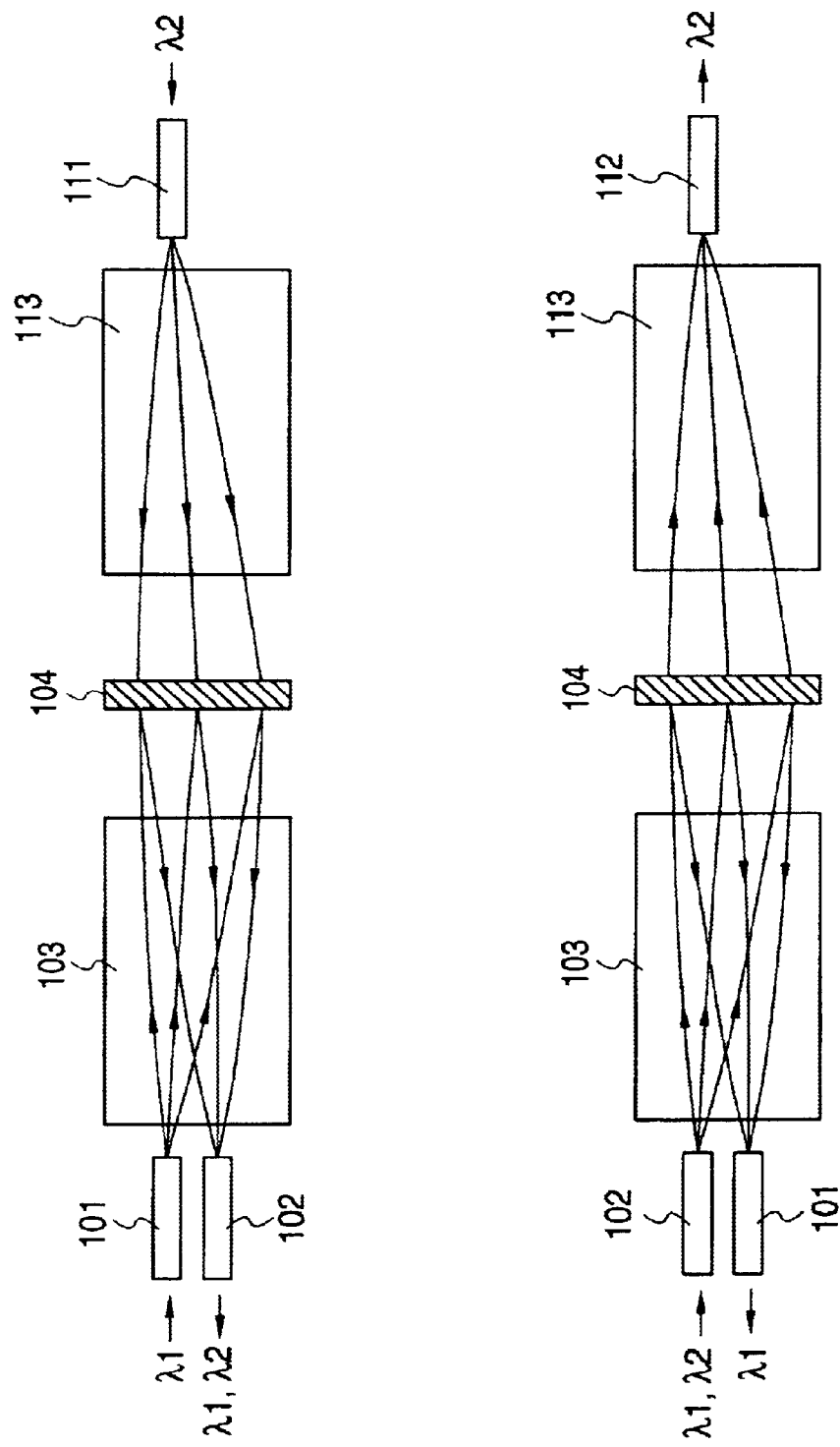
FIG. 6 is a view showing an optical system for a demultiplexing/multiplexing device using rod lenses.

The coupling loss of the optical system shown in FIG. 6 was calculated in the condition that optimization was performed while various parameters were changed. Results of the calculation were as shown in Table 1. A single-mode optical fiber with an applied wavelength λ=1550 nm and a numerical aperture NA=0.1 (spread in $1/e^2$ intensity) was used as each of the optical fibers.

For calculation, the following parameters were first initialized.

$r_0$: effective radius of the rod lens $n_0$: refractive index of the rod lens on the optical axis of the rod lens g: gradient index distribution coefficient of second order θF: angle of inclination of end surfaces of the optical fibers θR: angle of inclination of the rod lens W: distance between the optical axes of the two optical fibers Then, optimization was performed to make the focal position coincident with the end surface of the input optical fiber on its optical axis while L and Δy were changed.

L: distance between each of the end surfaces of the optical fibers and the end surface of the rod lens Δy: position of the optical axes of the optical fibers in the Y-axis direction (with reference to the optical axis of the rod lens)

A high-order index distribution coefficient $h_4$=+0.67 was used for correcting spherical aberration. In the results of calculation for the coupling loss, the coupling loss was expressed in dB in the case where the reflectance of the reflecting layer was 100%. Fresnel reflection and internal absorption in boundaries were ignored.

Figure 2:
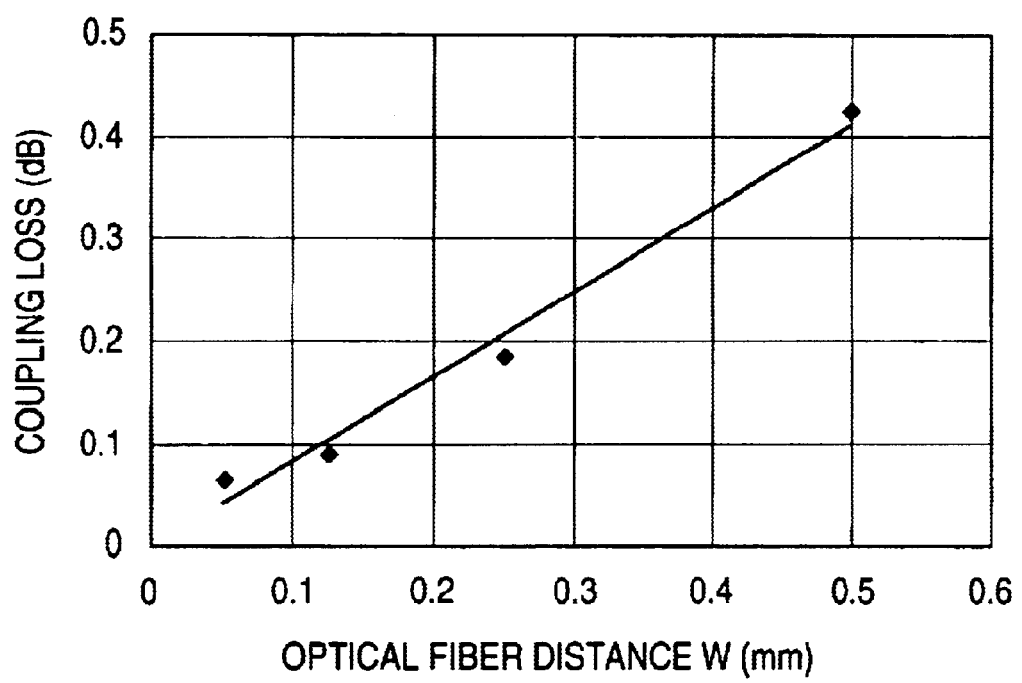
FIG. 2 is a graph showing an example of calculation of a characteristic of the optical device according to the invention.
Figure 3:
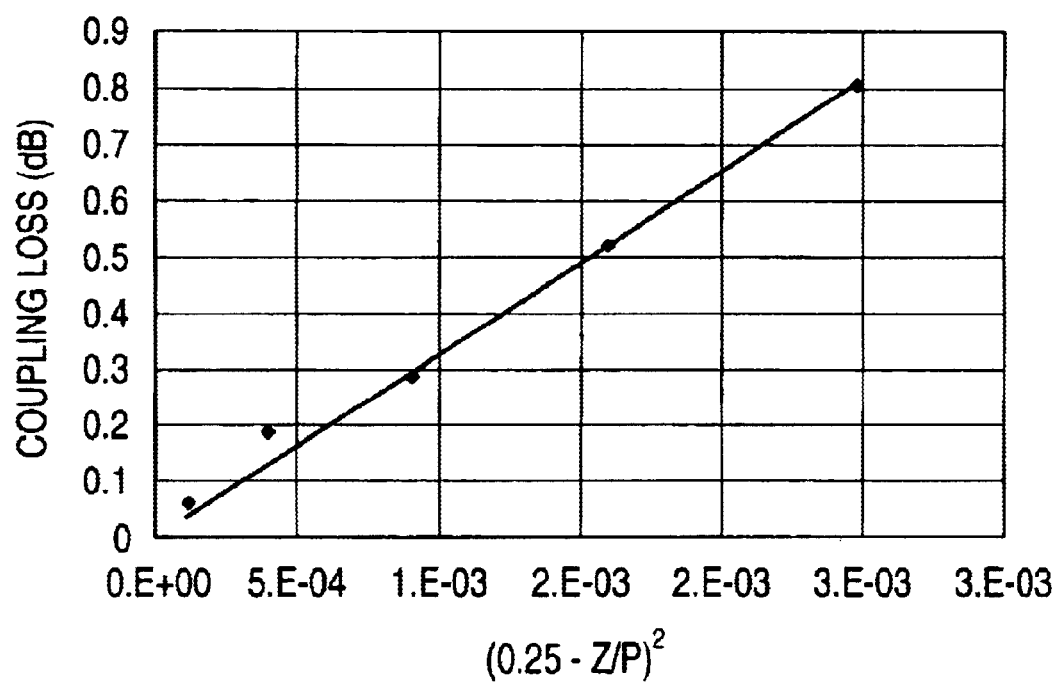
FIG. 3 is a graph showing an example of calculation of another characteristic of the optical device according to the invention.
Figure 4:
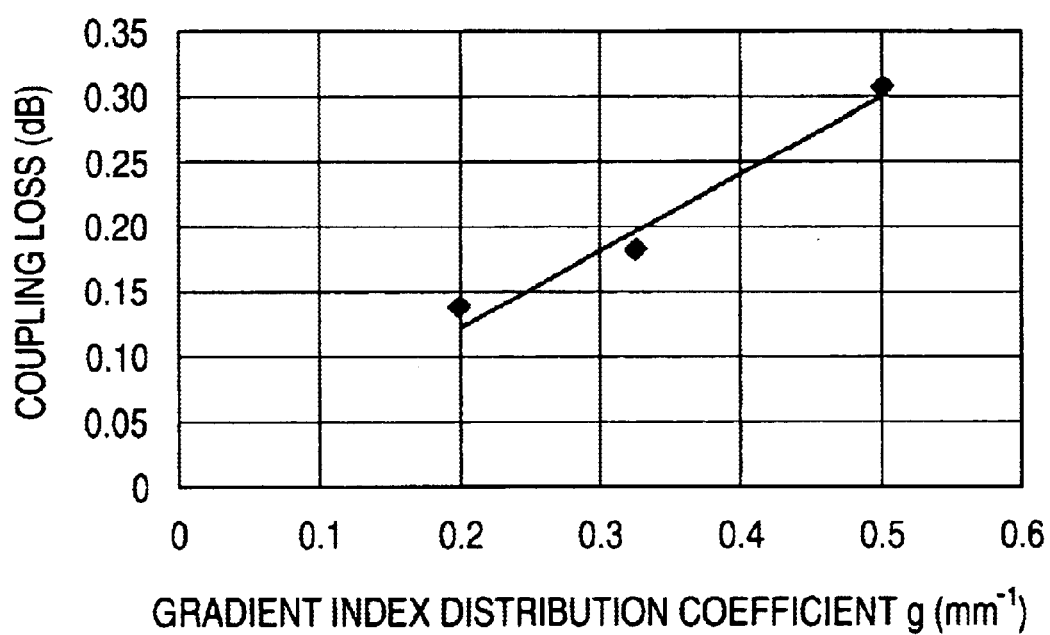
FIG. 4 is a graph showing an example of calculation of a further characteristic of the optical device according to the invention.

It was proved from the results of calculation that the coupling loss exhibits the following characteristics:

the size of the coupling loss is proportional to the distance W between the optical axes of the two optical fibers (see FIG. 2);

the size of the coupling loss is proportional to the square of the displacement (0.25−Z/P) of the rod lens length Z from 0.25P (see FIG. 3); and the size of the coupling loss is proportional to the gradient index distribution coefficient g (see FIG. 4).

Accordingly, it can be said that the coupling loss is proportional to the following value:

$$W \cdot g \cdot (0.25 - X/P)^2$$

Figure 5:
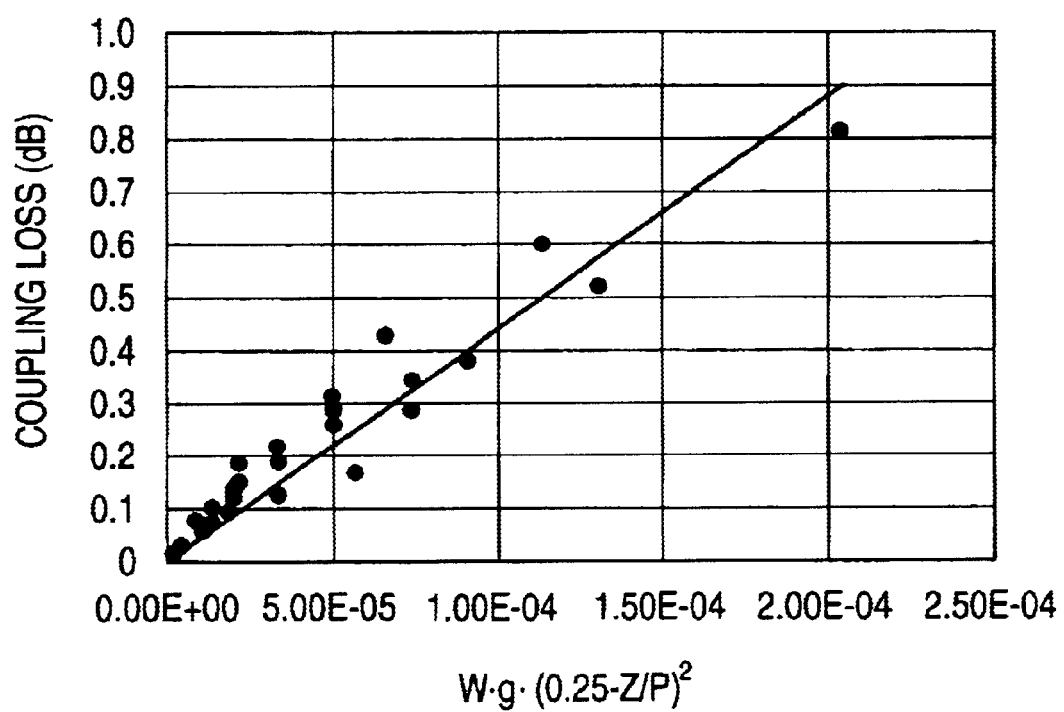
FIG. 5 is a graph showing an example of calculation of a characteristic of the optical device for parameters proposed by the invention.

To show this fact, the results shown Table 1 are formed as a graph in FIG. 5. In FIG. 5, the vertical axis expresses coupling loss and the horizontal axis expresses the following value:

$$W \cdot g \cdot (0.25 - Z/P)^2$$

It can be read from the graph that there was a good proportional relation. It is apparent from the proportional relation that the coupling loss can be suppressed to be not larger than a certain value if $W \cdot g \cdot (0.25-Z/P)^2$ is set to be not larger than a predetermined value.

In an optical device including an optical system constituted by a combination of a plurality of members, loss is caused by a plurality of factors. The inclination θd is one of factors causing a coupling loss. In order to design an optical device with low loss as a whole, it is necessary to suppress the loss due to the inclination θd to be not larger than 0.3 dB. For this reason, it is obvious from FIG. 5 that design may be performed to satisfy the condition:

$$W \cdot g \cdot (0.25 - Z/P)^2 \leq 2 \times 10^{-5}$$

In order to reduce the coupling loss, for example, to 0.1 dB or less, design may be performed to satisfy the condition:

$$W \cdot g \cdot (0.25 - Z/P)^2 \leq 2 \times 10^{-5}$$

The length Z of the rod lens 13 on the optical axis 33 of the rod lens 13 preferably satisfies the relation Z<0.25P so that the distance L between the rod lens 13 and each of the optical fibers 11 and 12 can be secured to a certain degree. From the formula of rod lens paraxial rays, the value of L is expressed as follows.

$$L = \cot(gZ)/(n_0 \cdot g)$$

It is necessary that the value of L is not smaller than 5 μm (the focal depth of optical fiber-coupling) in order to take a margin for focus control. It is therefore preferable that the value of Z is determined so that the value of L is not smaller than 5 μm by the expression (see Laser Research Vol.8, No.5, p.13, 1980).

Referring to Table 1, L of about 50 μm may be taken even in the case of Z=0.245P. When Z is set to be slightly smaller than 0.25P, a margin for adjusting L to a certain degree can be secured. If L is contrariwise too large, comatic aberration caused by the oblique end surfaces becomes large. Therefore, the lower limit of Z is preferably selected to be not smaller than 0.15P, especially not smaller than 0.20P.

Although the optical fibers (the output optical fiber 11 and the input optical fiber 12) used in the invention are designed on the promise that single-mode optical fibers (with an applied wavelength range of from 900 nm to 1,600 nm) for optical communication are used, it is a matter of course that step-index or refractive-index multi-mode optical fibers can be used in another wavelength range.

The outer diameter $2r_0$ of the effective portion of the rod lens 13 used in the invention is preferably set to be in a range of from 0.1 mm to 5 mm. It is difficult to produce a rod lens in which the outer diameter exceeds this range.

The outer diameter of the effective portion of the rod lens 13 is more preferably set to be not smaller than twice as large as the clad outer diameter df of the optical fiber 11 so that the luminous flux output from the optical fiber 11 can be utilized without waste. Because the standard of df is 0.125 mm, $2r_0$ is preferably set to be not smaller than 0.25 mm. If the outer diameter is larger than 2 mm, it is difficult to reduce the size and weight of the optical device as a whole. Therefore, the outer diameter is preferably set to be not larger than 2 mm. Incidentally, the outer diameter of 1.8 mm which is a practically international standard of the communication rod lens is a particularly preferred value. Hence, calculation is substantially performed in the case of $r_0=0.9$ mm.

It is a matter of course that W cannot be set to be smaller than df. It is further necessary that at least the clad outer circumferential portions of the two optical fibers 11 and 12 are not out of the effective diameter of the rod lens 13 so that light can be transmitted between each of the two optical fibers 11 and 12 and the rod lens 13 without waste. Therefore, it is necessary that W is set to be in the range:

$$df \leq W \leq 2r_0 - df$$

Because light output from the optical fiber is actually spread in accordance with the angular aperture of the optical fiber, W is preferably set to be sufficiently smaller than the upper limit of the range.

The lower limit of the center refractive index no of the rod lens 13 is about 1.4 when glass or plastics is used as the material of the rod lens 13. When glass containing a large amount of high-refractive-index components such as lead oxide, lanthanum oxide, etc. is used as the material of the rod lens 13, the center refractive index no can be increased to about 2.0 at maximum. When the amount of high-refractive-index components is large, there is however a problem that the speed of ion exchange is made extremely slow or the rod lens is apt to be devitrified. Therefore, the preferred range of the center refractive index $n_0$ is from 1.55 to 1.80, both inclusively.

The brightness of the rod lens 13 is defined by the angular aperture $\theta = n_0 \cdot g \cdot r_0$ (unit: rad) indicating the range of light allowed to be taken in the lens. The angular aperture $\theta$ is preferably set to be in the range:

$$0.1 \leq \theta \leq 1.0$$

If the value of $\theta$ is smaller than 0.1, the numerical aperture NA becomes so small that all the light output from the optical fiber 11 can hardly be collected. As a result, a loss caused by shading becomes large. It is also difficult to produce a rod lens having such a large refractive index difference that the value of $\theta$ is larger than 1.0. The further preferred range of $\theta$ in which the rod lens can be produced easily is $0.15 \leq \theta \leq 0.60$.

The quantity of aberration of the rod lens 13 is determined on the basis of the gradient index distribution coefficients $h_4$, $h_6$, $h_8$, . . . If the coefficient $h_4$ is set to be equal to +0.67, sufficient performance can be obtained in the situation used in the invention because the quantity of spherical aberration is substantially not larger than the diffraction limit when NA is not larger than 0.2 (see Laser Research Vol.8, No. 5, p.13, 1980). The quantity of aberration can be reduced further greatly when the values of $h_6$, $h_8$, . . . are optimized.

The angle $\theta F$ between a line normal to the end surfaces (facing the rod lens) 51 and 52 of the output and input optical fibers 11 and 12 and each of the optical axes 31 and 32 of the optical fibers is preferably set to be in a range of from 4° to 15°. If the angle is lower than 4°, the effect of preventing crosstalk cannot be obtained sufficiently. If the angle is higher than 15°, there is a fear that coupling efficiency may be lowered because of comatic aberration. Generally, the angle $\theta F$ is set to be in a range of from 6° to 8° and this range is a more preferable range.

For the same reason, the end surface (facing the optical fibers) 53a of the rod lens 13 is also processed obliquely. The angle $\theta R$ of inclination of the end surface 53a is also preferably set to be in a range of from 4° to 15°, more preferably in a range of from 6° to 8°.

The simplest way to fill the gap between each of the end surfaces 51 and 52 of the optical fibers 11 and 12 and the end surface 53a of the rod lens 13 is to use air or vacuum to fill the gap. When the gap is filled with a medium 5 having a high refractive index as described above, there is an advantage in that non-reflective coating can be omitted because Fresnel reflection in boundaries can be reduced as well as there is an effect in reducing the coupling loss. Because the center refractive index of the core of a single-mode optical fiber used for optical communication is about 1.45 (the value of quartz), the refractive index $n_L$ of the medium is particularly preferably selected to be in the range:

$$1.4 \leq n_L \leq 1.8$$

Examples of standard numerical values will be described with reference to Table 1. Single-mode optical fibers each having a clad outer diameter of 125 μm and having an end surface processed L to be inclined at an angle of 8° are used as the optical fibers. The rod lens has an effective portion with an outer diameter of 1.8 mm and has a lens length of 0.23 P. The center refractive index of the lens is 1.59. The gradient index distribution coefficient g of the lens is 0.326 $mm^{-1}$. On this occasion, the numerical aperture is 0.467. When W is equal to 250 μm and the gap is filled with air in this combination, the following equation is obtained.

$$W \cdot g \cdot (0.25 - Z/P)^2 = 3.26 \times 10^{-5}$$

On this occasion, the optimum position is obtained in the case of L=0.2366 mm and $\Delta y = -19.7$ μm. The calculated coupling loss is 0.18 dB, which satisfies the requirement that the coupling loss must be not larger than 0.3 dB. When an adhesive agent having a refractive index of 1.5 is interposed between each of the end surfaces of the optical fibers and the end surface of the rod lens in the same configuration, L is slightly increased to be equal to 0.364 mm. On this occasion, the coupling loss is about 0.12 dB, which preferably exhibits a considerably improved result.

When there is used the same condition as described above except that the lens length is set to be 0.24P, the following equation is obtained.

$$W \cdot g \cdot (0.25 - Z/P)^2 = 1.30 \times 10^{-4}$$

On this occasion, the condition that the coupling loss is not larger than 0.1 dB is satisfied. The calculated coupling loss is 0.055 dB, which is not larger than 0.1 dB. The gap between each of the optical fibers and the rod lens is, however, made small because of L=0.1174 mm.

If the lens length is contrariwise set to be 0.21P, the following equation is obtained.

$$W \cdot g \cdot (0.25 - Z/P)^2 = 1.30 \times 10^{-4}$$

On this occasion, the condition cannot be satisfied.

The parameter $W \cdot g \cdot (0.25 - Z/P)^2$ proposed in the invention contains neither $n_0$ nor $r_0$. This suggests that an optical system with a small coupling loss can be achieved regardless of other parameters for the lens and the optical fibers when g and Z as the parameters of the lens are given and W is set suitably in accordance with the formula. Points shown in FIG. 5 contain results of calculation in accordance with various conditions shown in Table 1. This suggests that the linear correlation between the coupling loss and the parameter $W \cdot g \cdot (0.25 - Z/P)^2$ holds regardless of other parameters for the lens and the optical fibers.

The parameter proposed in the invention has no relation to the characteristic of the reflecting unit. When the optical device according to the invention is a multiplexing device or a demultiplexing device as described preliminarily, a wavelength selective filter is used as the reflecting unit. The filter can be achieved when an optically multilayer film is formed on an end surface of the rod lens. Besides, the condition of the invention can be applied to a reflecting unit such as a reflecting metal layer or a reflecting unit having another function.

The embodiment has bee described upon the case where a pair of output and input optical fibers are provided in correspondence with one rod lens. A plurality of pairs of output and input optical fibers, however, may be provided in correspondence to one rod lens so long as they can be disposed physically.

TABLE 1

A

| | $r_0$ (mm) | $n_0$ | g (1/mm) | $n_0 \cdot g \cdot r_0$ | Z/P | Z (mm) | $\Theta F$ (°) | $\Theta R$ (°) |
|---|---|---|---|---|---|---|---|---|
| 1 | 0.90 | 1.59 | 0.326 | 0.467 | 0.245 | 4.72 | 8 | 8 |
| 2 | 0.90 | 1.59 | 0.326 | 0.467 | 0.240 | 4.63 | 8 | 8 |
| 3 | 0.90 | 1.59 | 0.326 | 0.467 | 0.235 | 4.53 | 8 | 8 |
| 4 | 0.90 | 1.59 | 0.326 | 0.467 | 0.230 | 4.43 | 8 | 8 |
| 5 | 0.90 | 1.59 | 0.326 | 0.467 | 0.220 | 4.24 | 8 | 8 |
| 6 | 0.90 | 1.59 | 0.326 | 0.467 | 0.210 | 4.05 | 8 | 8 |
| 7 | 0.90 | 1.59 | 0.326 | 0.467 | 0.200 | 3.85 | 8 | 8 |
| 8 | 0.90 | 1.59 | 0.326 | 0.467 | 0.230 | 4.43 | 8 | 8 |
| 9 | 0.90 | 1.59 | 0.326 | 0.467 | 0.230 | 4.43 | 8 | 8 |
| 10 | 0.90 | 1.59 | 0.326 | 0.467 | 0.230 | 4.43 | 8 | 8 |
| 11 | 0.90 | 1.59 | 0.326 | 0.467 | 0.230 | 4.43 | 8 | 8 |
| 12 | 0.90 | 1.59 | 0.326 | 0.467 | 0.230 | 4.43 | 8 | 8 |
| 13 | 0.90 | 1.60 | 0.500 | 0.720 | 0.220 | 2.76 | 8 | 0 |
| 14 | 0.90 | 1.80 | 0.326 | 0.528 | 0.220 | 4.24 | 8 | 8 |
| 15 | 0.90 | 1.80 | 0.326 | 0.528 | 0.240 | 4.63 | 8 | 8 |
| 16 | 0.90 | 1.80 | 0.326 | 0.528 | 0.235 | 4.53 | 8 | 8 |
| 17 | 0.90 | 1.80 | 0.326 | 0.528 | 0.230 | 4.43 | 8 | 8 |
| 18 | 0.125 | 1.60 | 1.000 | 0.200 | 0.240 | 1.51 | 8 | 8 |
| 19 | 0.125 | 1.60 | 1.000 | 0.200 | 0.230 | 1.45 | 8 | 8 |
| 20 | 0.125 | 1.60 | 1.000 | 0.200 | 0.220 | 1.38 | 8 | 8 |
| 21 | 0.25 | 1.55 | 1.000 | 0.388 | 0.230 | 1.45 | 15 | 15 |
| 22 | 0.40 | 1.50 | 1.000 | 0.600 | 0.240 | 1.51 | 10 | 12 |
| 23 | 0.50 | 1.80 | 0.400 | 0.360 | 0.240 | 3.77 | 6 | 8 |
| 24 | 0.60 | 1.59 | 0.500 | 0.477 | 0.230 | 2.89 | 8 | 8 |
| 25 | 1.00 | 1.60 | 0.200 | 0.320 | 0.220 | 6.91 | 6 | 6 |
| 26 | 1.50 | 1.59 | 0.200 | 0.477 | 0.230 | 7.23 | 8 | 8 |
| 27 | 2.00 | 2.00 | 0.200 | 0.800 | 0.230 | 7.23 | 8 | 8 |
| 28 | 0.90 | 1.59 | 0.326 | 0.467 | 0.250 | 4.82 | 8 | 8 |
| 29 | 0.90 | 1.80 | 0.326 | 0.528 | 0.250 | 4.82 | 8 | 8 |
| 30 | 0.125 | 1.60 | 1.000 | 0.200 | 0.250 | 1.57 | 8 | 8 |

B

| | W (mm) | $n_L$ | L (mm) | $\Delta y$ (mm) | $W \cdot g \cdot (0.25 - Z/P)^2$ | Coupling Loss (dB) |
|---|---|---|---|---|---|---|
| 1 | 0.250 | 1.0 | 0.0582 | −0.0048 | 2.04 E−06 | 0.020 |
| 2 | 0.250 | 1.0 | 0.1174 | −0.0098 | 8.15 E−06 | 0.055 |
| 3 | 0.250 | 1.0 | 0.1768 | −0.0147 | 1.83 E−05 | 0.109 |
| 4 | 0.250 | 1.0 | 0.2366 | −0.0197 | 3.26 E−05 | 0.184 |
| 5 | 0.250 | 1.0 | 0.3577 | −0.0299 | 7.34 E−05 | 0.283 |
| 6 | 0.250 | 1.0 | 0.4818 | −0.0402 | 1.30 E−04 | 0.517 |
| 7 | 0.250 | 1.0 | 0.6099 | −0.0509 | 2.04 E−04 | 0.810 |
| 8 | 0.050 | 1.0 | 0.2374 | −0.0199 | 6.52 E−06 | 0.065 |
| 9 | 0.125 | 1.0 | 0.2372 | −0.0198 | 1.63 E−05 | 0.091 |
| 10 | 0.500 | 1.0 | 0.2344 | −0.0194 | 6.52 E−05 | 0.423 |
| 11 | 0.250 | 1.5 | 0.3640 | −0.0030 | 3.26 E−05 | 0.117 |
| 12 | 0.250 | 1.6 | 0.3890 | 0.0004 | 3.26 E−05 | 0.116 |
| 13 | 0.125 | 1.0 | 0.2355 | 0.0001 | 5.63 E−05 | 0.158 |
| 14 | 0.250 | 1.0 | 0.3155 | −0.0357 | 7.34 E−05 | 0.337 |
| 15 | 0.250 | 1.0 | 0.1035 | −0.0117 | 8.15 E−06 | 0.062 |
| 16 | 0.250 | 1.0 | 0.1560 | −0.0176 | 1.83 E−05 | 0.126 |
| 17 | 0.250 | 1.0 | 0.2087 | −0.0236 | 3.26 E−05 | 0.214 |
| 18 | 0.125 | 1.0 | 0.0375 | −0.0032 | 1.25 E−05 | 0.081 |

-continued

B

| | W (mm) | $n_L$ | L (mm) | Δy (mm) | W·g·(0.25 − Z/P)² | Coupling Loss (dB) |
|---|---|---|---|---|---|---|
| 19 | 0.125 | 1.0 | 0.0762 | −0.0064 | 5.00 E−05 | 0.281 |
| 20 | 0.125 | 1.0 | 0.1155 | −0.0098 | 1.13 E−04 | 0.602 |
| 21 | 0.125 | 1.5 | 0.1204 | −0.0010 | 5.00 E−05 | 0.255 |
| 22 | 0.125 | 1.0 | 0.0395 | −0.0042 | 1.25 E−05 | 0.070 |
| 23 | 0.250 | 1.5 | 0.1291 | −0.0036 | 1.00 E−05 | 0.061 |
| 24 | 0.250 | 1.0 | 0.1535 | −0.0128 | 5.00 E−05 | 0.304 |
| 25 | 0.500 | 1.6 | 0.9580 | 0.0008 | 9.00 E−05 | 0.377 |
| 26 | 0.250 | 1.0 | 0.3893 | −0.0325 | 2.00 E−05 | 0.135 |
| 27 | 0.250 | 1.0 | 0.3070 | −0.0435 | 2.00 E−05 | 0.170 |
| 28 | 0.250 | 1.0 | 0 | 0 | 0 | 0.003 |
| 29 | 0.250 | 1.0 | 0 | 0 | 0 | 0.003 |
| 30 | 0.125 | 1.0 | 0 | 0 | 0 | 0.009 |

For convenience purpose, the original Table 1 in base Japanese patent application is divided into two parts, i.e. table 1A and table 1B shown above. The relationship between tables 1A and 1B are such that the first row of the table 1A corresponds to the first row of the table 2A, the second row of the table 1A corresponds to the second row of the table 2A, . . . .

As described above, in accordance with the invention, the coupling loss of an optical device having a gradient index rod lens provided with a reflecting unit on one end surface of the rod lens, and a pair of output and input optical fibers on the other end surface of the rod lens can be suppressed to a small value to be not larger than a predetermined value.

What is claimed is:

1. An optical device comprising an optical system constituted by a combination of an output optical fiber, an input optical fiber and a gradient index rod lens, said output optical fiber and said input optical fiber being arranged so that optical axes of said two optical fibers are parallel to each other with a distance of W, said gradient index rod lens having a length of Z on its optical axis and having a radially gradient index distribution represented by a formula:

$$n(r)^2 = n_0^2 \cdot \{1-(g\cdot r)^2 + h_4(g\cdot r)^4 + h_6(g\cdot r)^6 h_8(g\cdot r)^8 + \ldots\}$$

in which r is a radial distance measured from the optical axis of said rod lens, no is the refractive index of said rod lens on the optical axis of said rod lens, g is a gradient index distribution coefficient of second order, and $h_4$, $h_6$, $h_8$ . . . are gradient index distribution coefficients of fourth sixth, eighth . . . order respectively, wherein:

said optical axes of said two optical fibers are disposed in parallel to said optical axis of said rod lens so that, after a luminous flux output from said output optical fiber is input to said rod lens through a first end surface of said rod lens and converted into an approximately parallel luminous flux in the inside of said rod lens, at least one part of said parallel luminous flux is reflected by a reflecting unit disposed on a second end surface of said rod lens opposite to said first end surface of said rod lens, converted into a convergent luminous flux again in the inside of said rod lens, and input to said input optical fiber; and said optical device satisfies a condition:

$$W \cdot g \cdot (0.25 - Z/P)^2 \leq 6 \times 10^{-5}$$

in which P is a periodic length of said rod lens (equivalent to $2\pi/g$).

2. An optical device according to claim 1, wherein said optical device satisfies a condition:

$$W \cdot g \cdot (0.25 - Z/P)^2 \leq 2 \times 10^{-5}.$$

3. An optical device according to claim 1, wherein said two optical fibers have end surfaces parallel to a line perpendicular to the optical axes of said two optical fibers and inclined at an angle of inclination to a plane perpendicular to the optical axes of said two optical fibers.

4. An optical device according to claim 1, wherein said rod lens has an end surface facing said two optical fibers, parallel to a line perpendicular to the optical axes of said two optical fibers and inclined at an angle of inclination to a plane perpendicular to the optical axes of said two optical fibers.

* * * * *